(12) United States Patent
Asai

(10) Patent No.: US 10,530,918 B2
(45) Date of Patent: Jan. 7, 2020

(54) NON-TRANSITORY COMPUTER-READABLE MEDIUM AND PORTABLE TERMINAL

(71) Applicant: BROTHER KOGYO KABUSHIKI KAISHA, Nagoya-shi, Aichi-ken (JP)

(72) Inventor: Norihiko Asai, Tajimi (JP)

(73) Assignee: BROTHER KOGYO KABUSHIKI KAISHA, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/927,205

(22) Filed: Mar. 21, 2018

(65) Prior Publication Data

US 2018/0352068 A1     Dec. 6, 2018

(30) Foreign Application Priority Data

Jun. 2, 2017 (JP) ................................ 2017-109613

(51) Int. Cl.
  *H04M 1/725* (2006.01)
  *G06F 9/445* (2018.01)
  *G06F 8/61* (2018.01)

(52) U.S. Cl.
  CPC .......... *H04M 1/72525* (2013.01); *G06F 8/61* (2013.01); *G06F 9/445* (2013.01)

(58) Field of Classification Search
  CPC ........... H04N 1/00225; H04N 1/00307; H04N 1/00233; H04N 1/00411; H04N 1/00427; H04N 1/00435; G06F 3/04817; G06F 3/04842; G06F 17/24; G06K 15/401; G06K 15/4025
  See application file for complete search history.

(56) References Cited

U.S. PATENT DOCUMENTS

| | | | | |
|---|---|---|---|---|
| 2011/0072393 | A1* | 3/2011 | Wilairat | G06F 9/451 715/811 |
| 2012/0243043 | A1* | 9/2012 | Asai | H04N 1/00225 358/1.15 |
| 2013/0063619 | A1* | 3/2013 | Asai | H04M 1/27455 348/222.1 |
| 2013/0308159 | A1* | 11/2013 | Yoshimura | H04N 1/00973 358/1.15 |
| 2015/0346961 | A1* | 12/2015 | Cui | G06F 9/445 715/838 |

FOREIGN PATENT DOCUMENTS

JP       2012-203742 A    10/2012

* cited by examiner

*Primary Examiner* — Dung Hong
(74) *Attorney, Agent, or Firm* — Merchant & Gould P.C.

(57) ABSTRACT

A portable terminal has a memory having a program and an external program generating content data. The program transmits output instruction information for instructing to output content data to an output apparatus. The program determines whether previous content data is stored, displays a screen including a program object of the external program and a content object of the previous content data, and receives an input operation on the screen. When the program object is designated, the program activates the external program so as to cause the external program of the program object to newly generate the content data. When the content object is designated, the program receives, as target content data, the previous content data of the content object from the external program generating the previous content data, and transmits, to the output apparatus, the output instruction information instructing to execute the output operation for the target content data.

7 Claims, 11 Drawing Sheets

FIG. 2A

| APPLICATION ID | INSTALL FLAG | PATH INFORMATION |
|---|---|---|
| MAP | COMPLETION | MAP FOLDER |
| GREETING CARD | COMPLETION | GREETING CARD FOLDER |
| LABEL | NOT YET | — |

FIG. 2B

| APPLICATION ID | CONTENT ID | THUMBNAIL IMAGE DATA | PRINT FLAG | CONDITION INFORMATION |
|---|---|---|---|---|
| MAP | 001 | THUMBNAIL 001.JPG | COMPLETION | CONDITION A |
| MAP | 002 | THUMBNAIL 002.JPG | NOT YET | CONDITION B |
| ... | ... | ... | ... | ... |

FIG. 2C

| APPLICATION ID | CONTENT ID | PRINT DATA |
|---|---|---|
| MAP | 001 | PRINT DATA A |

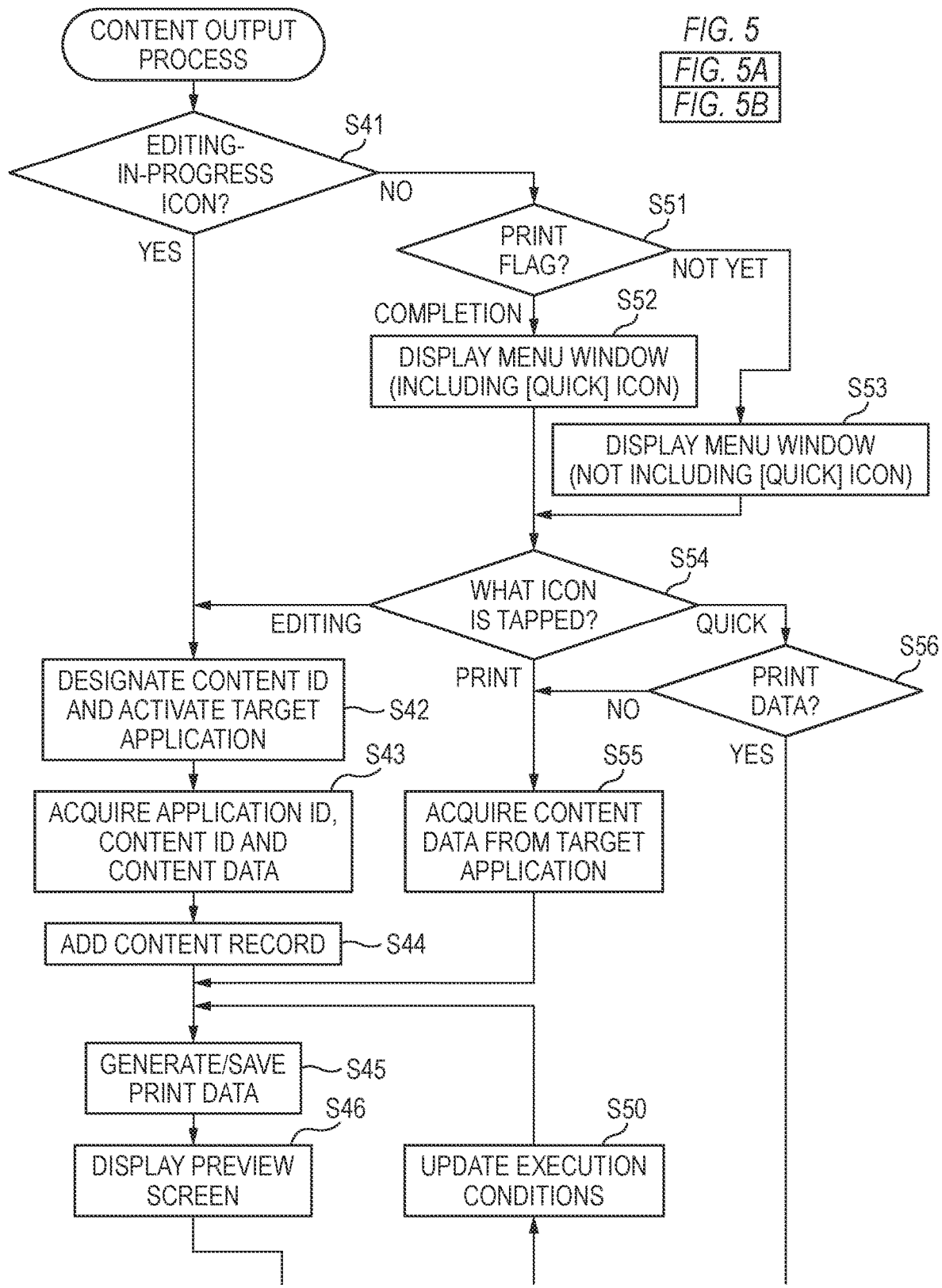

NON-TRANSITORY COMPUTER-READABLE MEDIUM AND PORTABLE TERMINAL

CROSS-REFERENCE TO RELATED APPLICATION

This application claims priority from Japanese Patent Application No. 2017-109613 filed on Jun. 2, 2017, the entire subject-matter of which is incorporated herein by reference.

TECHNICAL FIELD

The present disclosure relates to a non-transitory computer-readable medium having a program that enables an output apparatus to execute an output operation, and a portable terminal having a computer that enables to execute the program.

BACKGROUND

There has been disclosed an operation instruction program configured to enable an output apparatus to execute an output operation. More specifically, the related-art operation instruction program is to enable a user to designate an output apparatus, and to enable the designated output apparatus to execute an output operation. Also, regarding the operation instruction program described above, there is an operation instruction program capable of activating an external program for replacing functions of the operation instruction program, an external program for complementing functions of the operation instruction program or the like. The operation instruction program can cause the output apparatus to execute the output operation for content data acquired from the external program.

The output apparatus may not immediately execute the output operation instructed by the operation instruction program due to exhaustion of consumables for executing the output operation, for example. In this case, when retrying the output of content data, if a user should reactivate the external program so as to take over the content data to the external program, the user operation becomes troublesome.

SUMMARY

The specification discloses a non-transitory computer-readable medium having a program that enables to obtain a desired result with less input operations when an output apparatus executes an output operation in conjunction with an external program, and the portable terminal having a computer that enables to execute the program.

One illustrative aspect provides a non-transitory computer-readable medium having a program stored thereon and readably by a computer of a portable terminal comprising a memory, a display, a user interface, and a communication interface, and enabling to execute an external program that can be installed to the portable terminal and is configured to generate content data in accordance with an input operation received through the user interface, wherein the program is a program configured to transmit output instruction information that instructs to execute an output operation of outputting content data, to an output apparatus through the communication interface, wherein the program, when executed by the computer, causes the portable terminal to perform:

a first determination process of determining whether previous content data is stored in the memory, the previous content data being content data previously generated by the external program, a first display process of displaying, on the display, a first screen including a program object corresponding to the external program and a content object corresponding to the previous content data determined as stored in the memory in the first determination process; and a first operation reception process of receiving an input operation on the first screen through the user interface, wherein the program causes the portable terminal to perform, when the program object is designated by the input operation on the first screen in the first operation reception process, a first activation process of activating the external program so as to cause the external program corresponding to the program object to newly generate the content data, and wherein the program causes the portable terminal to perform when the content object is designated by the input operation on the first screen in the first operation reception process:

a first data reception process of receiving, as target content data, the previous content data corresponding to the content object from the external program that generates the previous content data; and an output instruction process of transmitting the output instruction information that instructs to execute the output operation for the target content data, to the output apparatus through the communication interface.

The aspect provides a portable terminal having:

a memory;
a display;
a user interface;
a communication interface; and
a controller that executes an operation instruction program installed in the portable terminal, wherein the portable terminal enables to execute an external program that can be installed to the portable terminal and is configured to generate content data in accordance with an instruction by a user of the portable terminal through the user interface, wherein the operation instruction program is a program configured to transmit output instruction information that instructs to execute an output operation of outputting content data, to an output apparatus through the communication interface, wherein the controller is executable with instructions which, when executed, cause the controller to perform:

a first determination process of determining whether previous content data is stored in the memory, the previous content data being content data previously generated by the external program, a first display process of displaying, on the display, a first screen including a program object corresponding to the external program and a content object corresponding to the previous content data determined as stored in the memory in the first determination process;

a first operation reception process of receiving an input operation on the first screen through the user interface, wherein the controller is executable with instructions which cause the controller to perform, when the program object is designated by the input operation on the first screen in the first operation reception process, a first activation process of activating the external program so as to cause the external program corresponding to the program object to newly generate the content data, and wherein the controller is executable with instructions which cause the controller to perform when the content object is designated by the input operation on the first screen in the first operation reception process:

a first data reception process of receiving, as target content data, the previous content data corresponding to the content object from the external program that generates the previous content data; and an output instruction process of transmitting the output instruction information that instructs to execute the output operation for the target content data, to the output apparatus through the communication interface.

According to the above configuration of the non-transitory computer-readable medium and the portable terminal, a user who wants the external program to newly generate content data has only to designate the program object, and a user who wants to execute the output operation for the previous content data has only to designate the content object. That is, it is possible to implement a desired result with less input operations.

BRIEF DESCRIPTION OF DRAWINGS

FIG. 2A depicts an example of a program list stored in a memory, FIG. 2B depicts an example of a content list stored in the memory, and FIG. 2C depicts an example of a set of an application ID, a content ID and print data stored in the memory.

FIGS. 5A and 5B is a flowchart of content output process.

DETAILED DESCRIPTION

Hereinafter, an illustrative embodiment of the present disclosure will be described with reference to the drawings. In the meantime, the illustrative embodiment to be described later is just an example of the present disclosure, and the illustrative embodiment of the present disclosure can be appropriately changed without changing the gist of the present disclosure. For example, an execution sequence of each process to be described later can be appropriately changed without changing the gist of the present disclosure.

Figure 1:
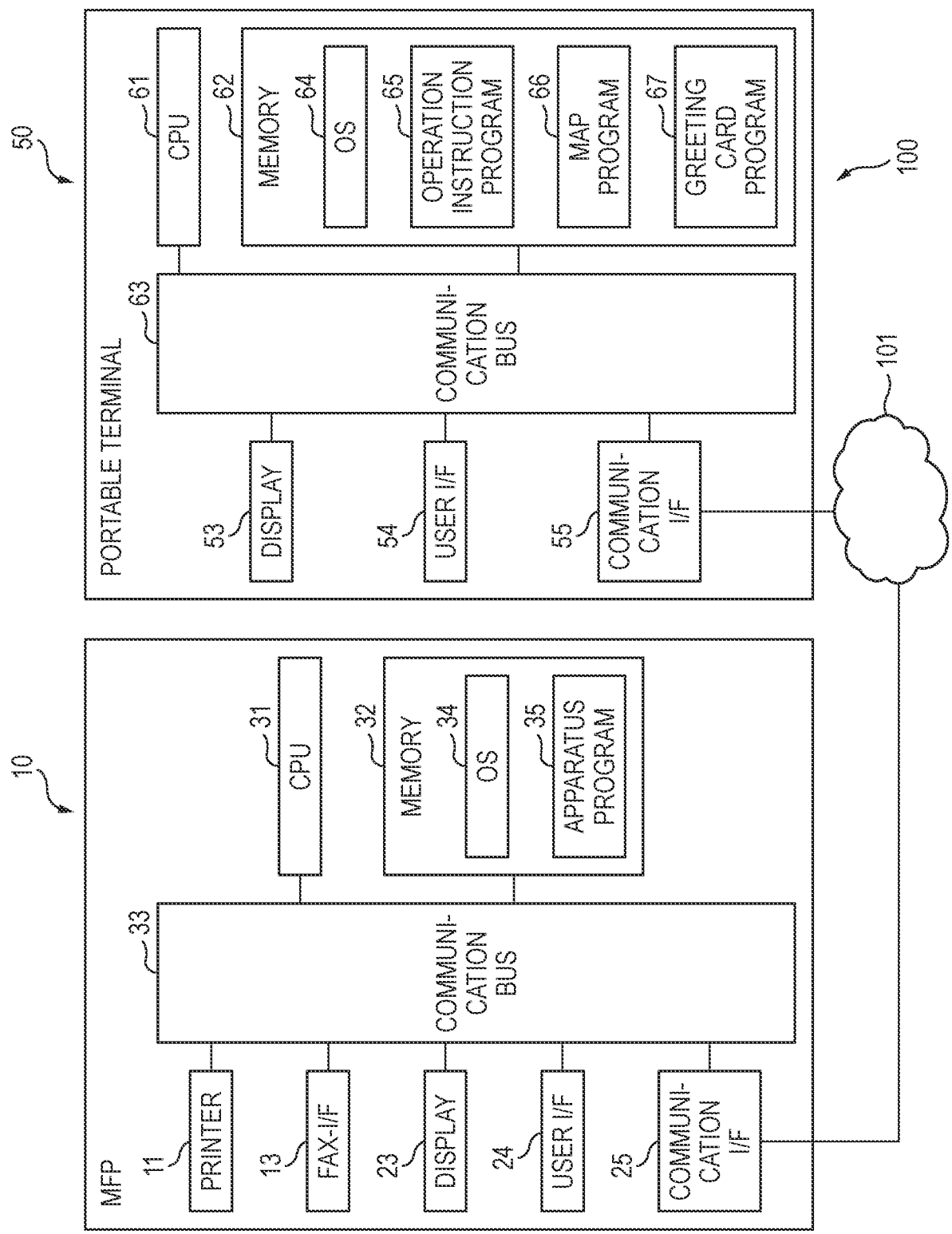
FIG. 1 is a block diagram of an MFP and a portable terminal configuring a system in accordance with an illustrative embodiment.
Figure 3:
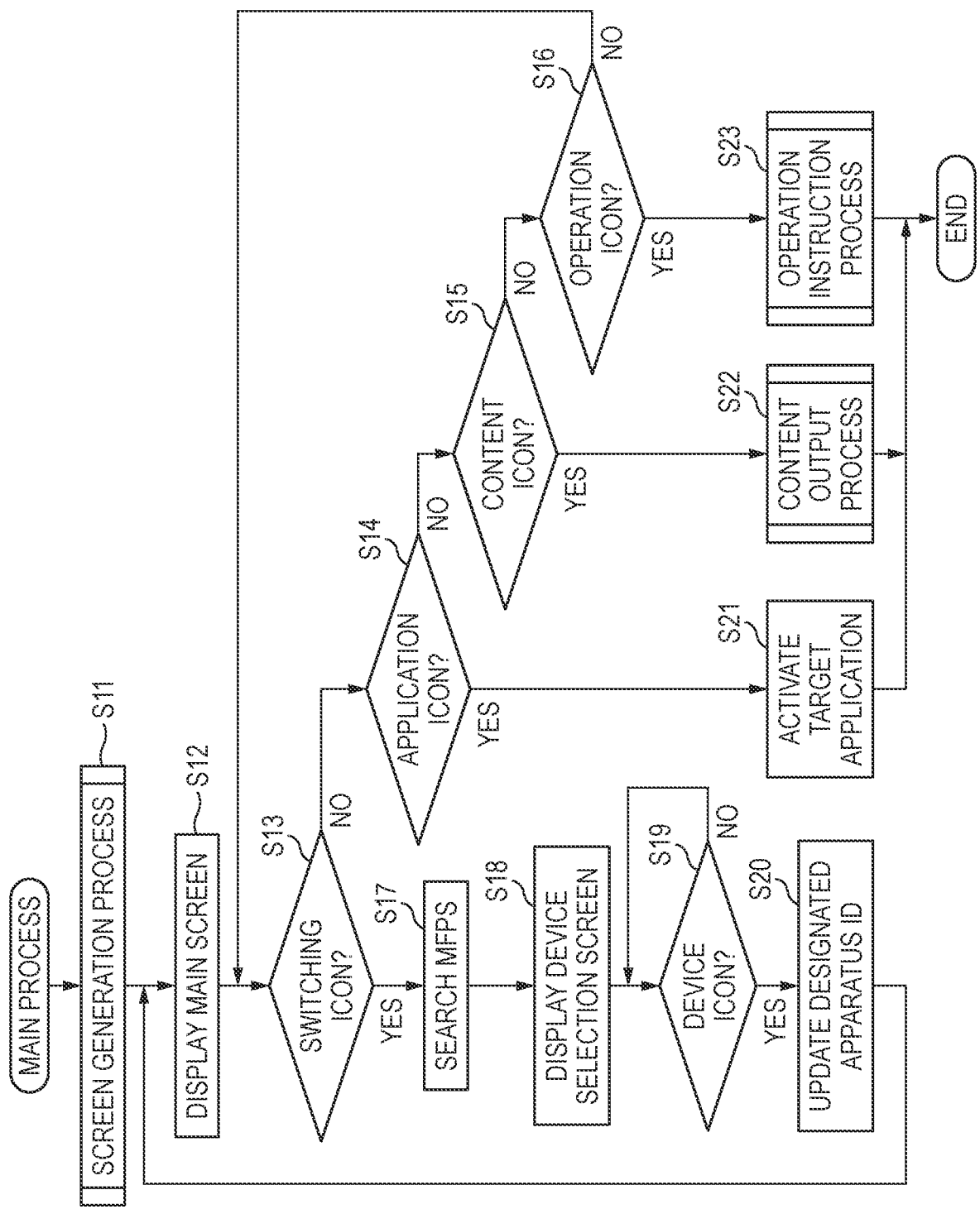
FIG. 3 is a flowchart of main process.
Figure 4:
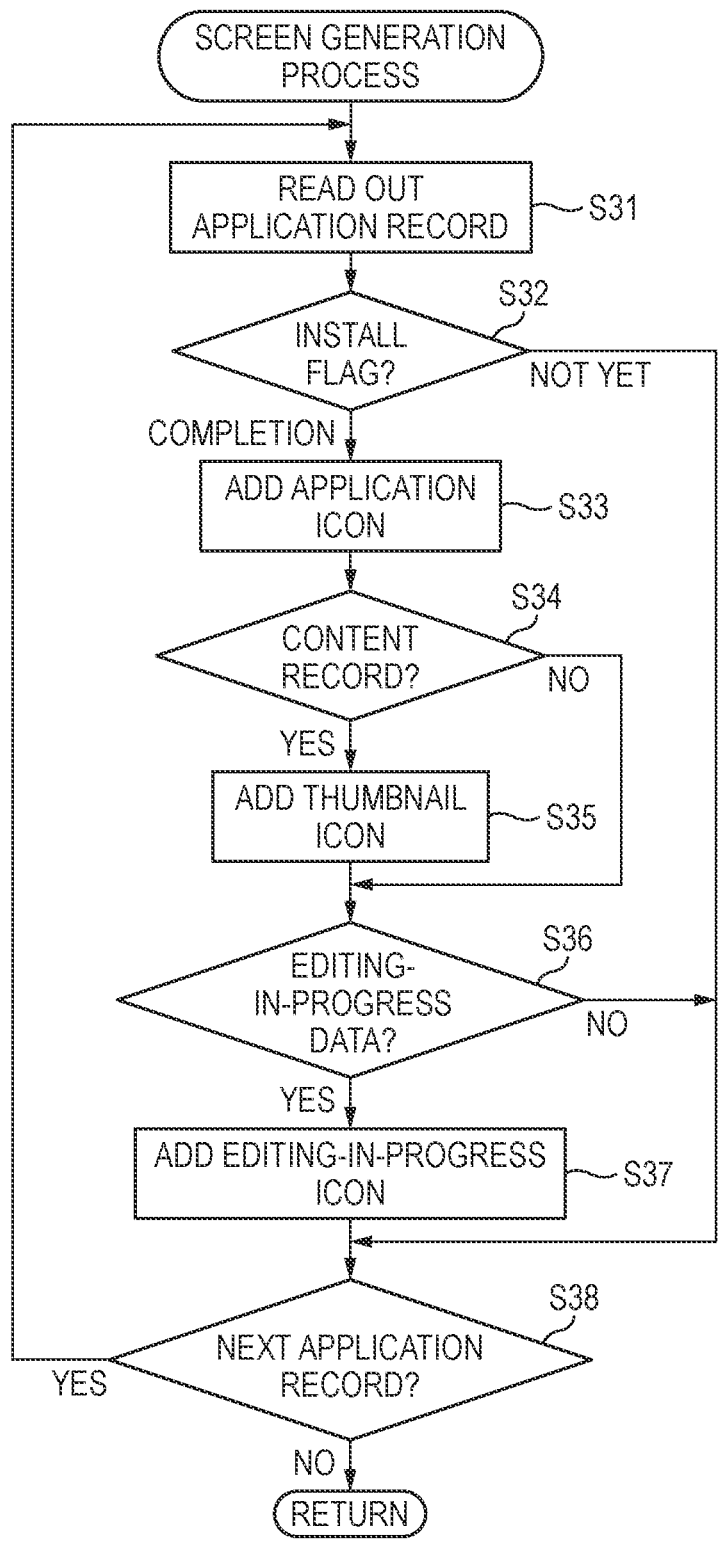
FIG. 4 is a flowchart of screen generation process.
Figure 5B:
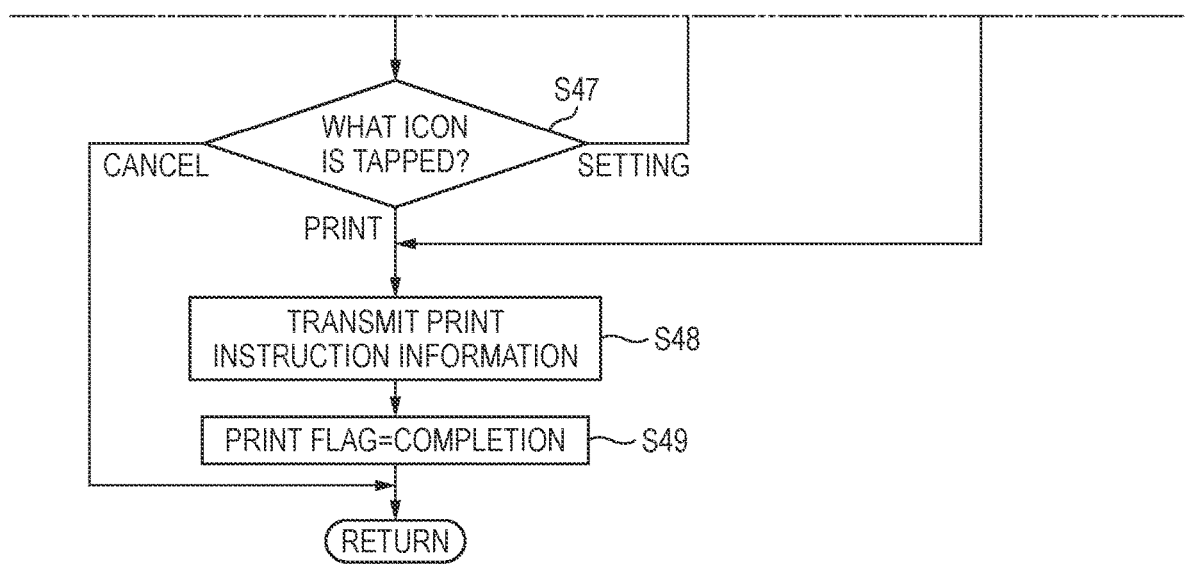

FIG. 1 is a schematic view of a system 100 in accordance with an illustrative embodiment. The system 100 shown in FIG. 1 includes a multifunction peripheral product (MFP) 10 and a portable terminal 50. The MFP 10 and the portable terminal 50 are configured to perform communication with each other via a communication network 101. The communication network 101 may be a wired LAN, a wireless LAN or a combination thereof, for example. Alternatively, the MFP 10 and the portable terminal 50 may also be connected by a USB cable or the like. The communication network 101 may be connected with a plurality of the MFPs 10.

As shown in FIG. 1, the MFP 10 mainly has a printer 11, a FAX I/F 13, a display 23, a user I/F 24, a communication I/F 25, a CPU 31, a memory 32 and a communication bus 33. The respective constitutional elements configuring the MFP 10 are connected to each other through the communication bus 33. The MFP 10 is an example of the output apparatus.

The printer 11 is hardware configured to execute a print operation of recording an image to be expressed by image data onto a sheet. In the illustrative embodiment, the inkjet-type printer 11 configured to eject ink to record an image is exemplified. However, the recording method of the printer 11 may be an electrophotographic method or the like. The FAX I/F 13 is hardware configured to execute a FAX transmission operation of FAX-transmitting image data to an external apparatus in accordance with a FAX protocol. The print operation and the FAX transmission operation are examples of the output operation.

The printer 11 is configured to execute the print operation in accordance with predetermined execution conditions. The execution conditions of the print operation are specified by a plurality of parameters corresponding to a plurality of items (for example, "size", "sheet type", "color" and the like). The item "size" indicates a sheet size (for example, "A4", "B5", "L-size", "postcard" or the like) on which an image is to be recorded. The item "sheet type" indicates a type of the sheet (for example, "normal sheet", "glossy sheet", "inkjet sheet" or the like) on which an image is to be recorded. The item "color" indicates a gradation of color (for example, "color" or "monochrome") of an image to be recorded on a sheet. Although the descriptions of specific examples are omitted, the FAX I/F 13 is also configured to execute the FAX transmission operation in accordance with predetermined execution conditions.

The display 23 is a liquid crystal monitor, an organic EL display or the like, and has a display surface for displaying a variety of information.

The user I/F 24 is an interface configured to receive an input operation. Specifically, the user I/F 24 has buttons and is configured to output a variety of operation signals associated with the pushed buttons to the CPU 31. Also, the user I/F 24 may have a touch sensor having a film shape and superimposed on the display surface of the display 23. An operation of designating an object displayed on the display surface of the display 23 and an operation of inputting a character string or a number string are examples of the input operation. The "object" includes a character string, an icon, a button, a link, a radio button, a check box, a pull-down menu and the like displayed on the display 23, for example.

The user I/F 24 implemented as a touch sensor is configured to output position information indicative of a position on the display surface touched by the user. Meanwhile, in the specification, the "touch" includes all operations of bringing an input medium into contact with the display surface. Also, although the input medium is not in contact with the display surface, "hover" or "floating touch" of bringing the input medium close to a position at which a distance between the input medium and the display surface is very small may be included in the concept of the "touch." Also, the input medium may be a user's finger, a touch pen or the like. An input operation of tapping a position of an object displayed on the display is an example of the designation operation of designating the object. Hereinafter, the designation operation of designating the object may be simply referred to as "designation of the object", "designation operation for the object", and the like The communication I/F 25 is an interface capable of performing communication with an external apparatus through the communication network 101. That is, the MFP 10 is configured to transmit a variety of information to the external apparatus through the communication I/F 25 and to receive a variety of information from the external apparatus through the communication I/F 25. Although a specific communication protocol of the communication I/F 25 is not particularly limited, Wi-Fi (Trademark) can be adopted, for example. Also, when the MFP 10 and the portable terminal 50 are connected to each other by a USB cable, the communication I/F 25 may be a USB I/F to which the USB cable can be detachably mounted.

The CPU 31 is configured to control overall operations of the MFP 10. The CPU 31 is configured to read out and execute a variety of programs (which will be described later) from the memory 32, based on a variety of information input through the user I/F 24 and a variety of information received from the external apparatus through the communication I/F 25. The CPU 31 and the memory 32 configure an example of the controller.

In the memory 32, an OS 34 and an apparatus program 35 are stored. The apparatus program 35 may be a single program or a set of a plurality of programs. Also, in the memory 32, data or information necessary to execute the apparatus program 35 is stored. The memory 32 is configured by a RAM, a ROM, an EEPROM, an HDD, a portable storage medium such as a USB memory to be detachably mounted to the MFP 10, a buffer of the CPU 31 or a combination thereof, for example.

The memory 32 may be a computer-readable storage medium. The computer-readable storage medium is a non-transitory medium. The non-transitory medium includes a recording medium such as a CD-ROM and a DVD-ROM as well as the above-described media. Also, the non-transitory medium is a tangible medium. In the meantime, an electric signal for carrying a program to be downloaded from a server or the like on the Internet is a computer-readable signal medium, which is a kind of the computer-readable medium, but is not included in the non-transitory computer-readable storage medium. This also applies to the memory 62 of the portable terminal 50, which will be described later.

As shown in FIG. 1, the portable terminal 50 mainly has a display 53, a user I/F 54, a communication I/F 55, a CPU 61, a memory 62 and a communication bus 63. Since the display 53, the user I/F 54, the communication I/F 55, the CPU 61, the memory 62 and the communication bus 63 included in the portable terminal 50 have the similar configurations to the display 23, the user I/F 24, the communication I/F 25, the CPU 31, the memory 32 and the communication bus 33 included in the MFP 10, the descriptions thereof are omitted. The CPU 61 and the memory 62 configure an example of the controller.

The portable terminal 50 is a portable phone, a smart phone, a tablet terminal, or the like, for example. More specifically, the display 53 of the portable terminal 50 preferably has a display screen size of 12 inch or less, and more preferably 8 inch or less. Also, the user I/F 54 of the portable terminal 50 is preferably a touch sensor superimposed on the display surface of the display 53. In the memory 62, an OS 64, an operation instruction program 65, and a map program 66 and a greeting card program 67, which are examples of the external program, are stored.

The OS 64 may be Android (Trademark) OS, iOS (Trademark), Windows Phone (Trademark) Operating System or the like, for example. The OS 64 can execute a plurality of programs installed in the portable terminal 50 in parallel. The plurality of programs is executed virtually in parallel by a time-division multiplex method, for example. Also, the OS 64 is configured to execute one of the plurality of programs, which are to be executed in parallel, at the foreground, and to execute the other programs at the background.

The foreground is a state in which a screen associated with execution of the program is displayed in most of a display region of the display 53, for example. The background is a state in which a screen associated with execution of another program different from the program is displayed in most of a display region of the display 53, for example. That is, the portable terminal 50 can display, on the display 53, only a screen associated with execution of a program, which is being executed at the foreground, of a plurality of programs being executed in parallel.

The operation instruction program 65 is a program for enabling the MFP 10 connected through the communication I/F 55 to execute the output operation. More specifically, the operation instruction program 65 is configured to enable a user to designate a content of the output operation (for example, a type of the output operation, content data, which is a target of the output operation, execution conditions of the output operation, and the like) through the user I/F 54, and to transmit, to the MFP 10, output instruction information for instructing the output operation of the designated content, through the communication I/F 55.

Also, the operation instruction program 65 can activate an external program installed in the portable terminal 50. The operation instruction program 65 is configured to designate, as an argument, a program ID of the external program, for example, and to execute an API (hereinafter, referred to as "activation API"), which is provided by the OS 64. In response to execution of the activation API, the OS 64 is configured to activate an external program identified with the designated program ID. On the other hand, the operation instruction program 65 may be configured to activate the external program in a so-called plug-in manner or to activate the external program by a sharing function that is provided by the OS 64.

The map program 66 has a function of receiving map image data, which indicates an area on a map designated through the user I/F 54 by the user, from a server (not shown) through the communication I/F 55. The greeting card program 67 has a function of generating communication surface image data, which expresses a communication surface image to be recorded on a communication surface of a postcard (typically, a greeting card), in accordance with a user's instruction through the user I/F 54. In the meantime, the specific examples of the external program are not limited to the map program 66 and the greeting card program 67. As another example, the external program may be a label program having a function of generating label image data, which expresses a label image to be recorded on a surface of a CD-ROM or the like, in accordance with a user's instruction through the user I/F 54. The map image data, the communication surface image data, and the label image data are examples of the content data.

Like this, the external program is a program in which a function, which is not mounted in the operation instruction program 65, is mounted, a program that can simply implement a function mounted in the operation instruction program 65, a program in which a function mounted in the operation instruction program 65 is more specifically implemented, or the like. Also, the external program is a program that is separate from the operation instruction program 65 and can be independently executed. That is, the external program is different from a subroutine of the operation instruction program 65. Also, the external program is a program configured to operate in the portable terminal 50 in which the operation instruction program 65 is provided.

As shown in FIG. 2A, the memory 62 can store therein an application list, for example. The application list includes one or more application records. Each application record included in the application list corresponds to one of one or more external programs. The external program is a program that can be installed in the portable terminal 50 and can be activated by the operation instruction program 65. For example, in the application list, an application record is registered at timing at which an the external program is installed in the portable terminal 50, and a new application record is added whenever the external program, which can be activated by the operation instruction program 65, is increased. The application record includes an application ID, an install flag and a path information, for example.

The application ID is an example of the program ID for identifying the external program. In the illustrative embodiment, the map program 66 is identified with an application ID "MAP", the greeting card program 67 is identified with an application ID "GREETING CARD", and the label program is identified with an application ID "LABEL". The install flag is information indicating whether the external program identified with the application ID is installed in the portable terminal 50. For the install flag, a first value "COMPLETION" indicating that the external program is installed, or a second value "NOT YET" indicating that the external program has not been installed yet is set. In the illustrative embodiment, the map program 66 and the greeting card program 67 have been already installed, and the label program has not been installed yet.

The path information is information indicative of a memory area of the memory 62 in which editing-in-progress data is stored. The editing-in-progress data is content data being generated or edited by the external program identified with the application ID. In the meantime, the description "content data being generated or edited by the external program" may indicate content data for which a user who operates the external program expresses an intention "to further edit the content data before setting the same as a target of the output operation" (for example, a tapping operation of a [save] icon 162 of FIG. 9B), for example. The path information indicates a path from a root folder of the memory 62 to a folder in which the editing-in-progress data is stored, for example. The folder indicated by the path information may store only one editing-in-progress data or a plurality of editing-in-progress data.

In the meantime, the present disclosure is not limited to the configuration where the editing-in-progress data is stored in the storage area indicated by the path information. As another example, the external program may be configured to store the editing-in-progress data in any storage area of the memory 62, in association with a flag or metadata indicative of the editing-in-progress data. The operation instruction program 65 and the external program may be configured to search the flag or the metadata in the memory 62 and to read out, as the editing-in-progress data, data associated with the detected flag or metadata from the memory 62.

Also, as shown in FIG. 2B, the memory 62 can store therein a content list, for example. The content list includes one or more content records. Each of the content records included in the content list corresponds to one of one or more content data acquired from the external program. The content record has not been registered in the content list upon install of the operation instruction program 65, for example, and is added to the content list in S44 (which will be described later) by the operation instruction program 65. The content record includes an application ID, a content ID, a thumbnail image data, a print flag, and condition information, for example.

The application ID is to identify an external program, which is an acquisition source of the content data. The content ID is identification information (for example, a file name) that is given by the external program so as to identify the content data. In the meantime, the content record may be uniquely identified by a combination of the application ID and the content ID, for example. The thumbnail image data is image data that is generated from the content data in accordance with a method to be described later.

The print flag is an example of the output completion information, which indicates whether the print operation has been executed for the content data. For the print flag, a third value "COMPLETION" indicating that the print operation has been already executed or a fourth value "NOT YET" indicating that the print operation has not been executed yet is set. The condition information indicates execution conditions of the print operation for the content data. More specifically, the condition information includes a plurality of parameters (for example, "A4", "normal sheet", "monochrome" and the like) corresponding to a plurality of items (for example, "size", "sheet type", "color" and the like).

In the meantime, the content record does not include the content data itself, which is identified with the content ID. The content data corresponding to the content record is stored in a memory area that is managed by the external program. That is, the content record corresponds to one of previous content data that was generated in the past by the external program. The operation instruction program 65 cannot directly read out the content data stored in the memory area, and should acquire the same through the external program. A method by which the operation instruction program 65 acquires the content data will be specifically described later.

Also, for example, as shown in FIG. 2C, the memory 62 can store therein only one set of the application ID, the content ID and print data. The print data is an example of the output data including a variety of instructions (for example, a sheet size, a color of ink to be discharged, a discharge timing of ink, and the like) described by a language (for example, PJL, PS or the like), which can be interpreted by the MFP 10, so as to execute the print operation for the content data identified with a combination of the application ID and the content ID. The print data is generated in S45 (which will be described later) by the operation instruction program 65, for example. However, the memory 62 may also be configured to store therein a plurality of sets of the application ID, the content ID and the print data. The set shown in FIG. 2C is stored in the memory 62 by the operation instruction program 65, in S45 (which will be described later), for example.

Also, although not shown, the memory 62 can store therein a designated apparatus ID. The designated apparatus ID is an apparatus ID (for example, a MAC address, a model name or the like) for identifying the MFP 10 (hereinafter, referred to as "designated apparatus"), which is designated by the user, of the MFPs 10 connected to the communication network 101. The designated apparatus ID is stored in the memory 62 by the operation instruction program 65, in S20 (which will be described later), for example.

Also, although not shown, the memory 62 may be provided with a data folder. In the data folder, photograph data, document data, presentation data, table calculation data and the like may be stored. The diverse data stored in the data folder is data that can be a target of the print operation.

[Operations of System 100]

The operations of the system 100 of the illustrative embodiment are described with reference to FIGS. 3 to 6. Meanwhile, it is assumed that an apparatus ID "MFP-A" of the MFP 10 has been stored in the memory 62, as the designated apparatus ID, upon start of main process of FIG. 3.

A flowchart of the specification basically indicates process that is to be executed by the CPUs 31, 61 in accordance with commands described in the program. That is, in the below descriptions, the process of "determination", "extraction", "selection", "calculation", "decision", "specifying", "acquisition", "reception", "control" and the like indicates the process of the CPUs 31, 61. The process that is to be executed by the CPUs 31, 61 includes hardware controls through the OSs 34, 64, too. In the meantime, "acquisition" is used as a concept in which request is not necessarily required. That is, the process in which data is received without the CPU 61 requesting the same is also included in the concept that "the CPU 61 acquires data." Also, in the specification, "data" is expressed by a bit string that can be read by a computer. The data having substantially the same meaning and the different formats is handled as the same data. This also applies to the "information" of the specification.

Figure 7A:
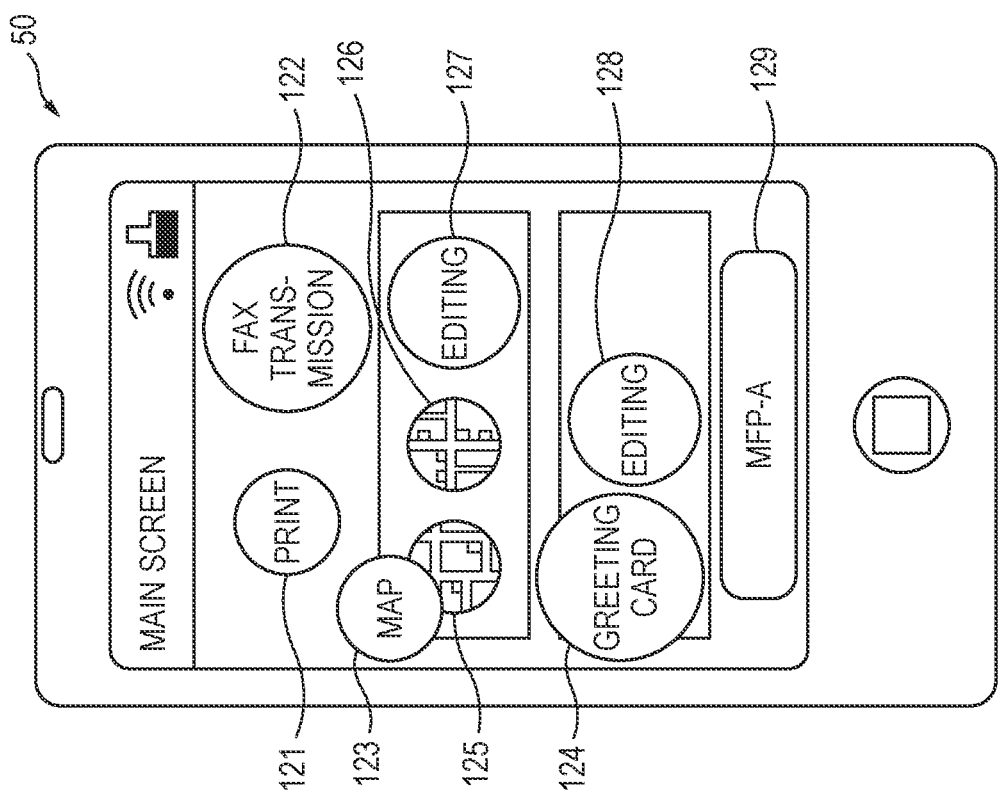
FIG. 7A depicts an example of a menu screen on a display.

First, the OS 64 of the portable terminal 50 displays a menu screen shown in FIG. 7A on the display 53. The menu screen includes program icons 111, 112, 113 corresponding to programs installed in the portable terminal 50. The program icon 111 corresponds to the operation instruction program 65, the program icon 112 corresponds to the map program 66, and the program icon 113 corresponds to the greeting card program 67. Then, the OS 64 receives an input operation on the menu screen through the user I/F 54.

As an example, when a designation operation of designating the program icon 112 is received through the user I/F 54, the OS 64 activates the map program 66 and executes the map program 66 at the foreground. When the program icon 112 is tapped and the map program 66 is thus activated by the OS 64, the map program 66 executes content editing process, which will be described later with reference to FIG. 6.

As another example, when a designation operation of designating the program icon 111 is received through the user I/F 54, the OS 64 activates the operation instruction program 65, and executes the operation instruction program 65 at the foreground. When the program icon 111 is tapped and the operation instruction program 65 is thus activated by the OS 64, the operation instruction program 65 executes the main process shown in FIG. 3.

[Operations of Operation Instruction Program 65]

First, the operation instruction program 65 executes screen generation process (S11). The screen generation process is process of generating a main screen, which will be described later. More specifically, the screen generation process is process of deciding an icon to be included in the main screen. In the meantime, the main screen always includes operation icons 121, 122 and a switching icon 129 shown in FIG. 7B. That is, in the screen generation process, the operation instruction program 65 determines whether or not to include an application icon, a thumbnail icon and an editing-in-progress icon in the main screen. The screen generation process is described in detail with reference to FIG. 4.

The operation instruction program 65 reads out one of the plurality of application records registered in the application list shown in FIG. 2A, from the memory 62 (S31). The application record read in S31 is referred to as "target application record". Hereinafter, process of S32 and thereafter is described on the assumption that an application record identified with an application ID "MAP" and a content ID "001" is read out.

Then, the operation instruction program 65 determines a setting value of the install flag of the target application record (S32). The process of S32 is an example of the second determination process of determining whether the external program corresponding to the application record is installed in the portable terminal 50. When it is determined that the first value "COMPLETION" is set for the install flag (S32: completion), the operation instruction program 65 adds an application icon 123, which is an example of the program object, to the main screen (S33). The application icon 123 is associated with the application ID "MAP" of the target application record. In the meantime, the configuration "the application icon 123 is added to the main screen" in S33 may indicate a configuration of setting "ON" for an addition flag corresponding to the application icon 123, for example. On the other hand, "OFF" is set for an addition flag corresponding to an icon that is not added to the main screen. This also applies to process of S35 and S37, which will be described later.

Then, the operation instruction program 65 determines whether the content record including the application ID "MAP" of the target application record is registered in the content list (S34). The process of S34 is an example of the first determination process of determining whether the previous content data is stored in the memory 62. When it is determined that the two content records including the application ID "MAP" are registered (S34: Yes), the operation instruction program 65 adds thumbnail icons 125, 126 to the main screen (S35).

The thumbnail icon 125 is associated with the application ID "MAP" and content ID "001" of the content record. Also, for the thumbnail icon 125, a thumbnail image that is to be expressed by thumbnail image data "THUMBNAIL 001.JPEG" of the content record is used. The thumbnail icon 126 is associated with the application ID "MAP" and a content ID "002" of the content record. Also, for the thumbnail icon 126, a thumbnail image that is to be expressed by thumbnail image data "THUMBNAIL 002.JPEG" of the content record is used.

Then, the operation instruction program 65 determines whether the editing-in-progress data is stored in the memory area indicated by the path information "MAP FOLDER" of the target application record (S36). The process of S36 is an example of the fifth determination process. When it is determined that the editing-in-progress data is stored (S36: Yes), the operation instruction program 65 adds an editing-in-progress icon 127, which is an example of the editing-in-progress object, to the main screen (S37). The editing-in-progress icon 127 is associated with the application ID "MAP" of the target application record. Also, for the editing-in-progress icon 127, a preset image different from the thumbnail image is used. That is, the thumbnail icons 125, 126 and the editing-in-progress icon 127 are displayed in different display aspects.

On the other hand, when it is determined that the second value "NOT YET" is set for the install flag of the target application record (S32: not yet), the operation instruction program 65 executes process of S38 and thereafter without executing process of S33 to S37. Also, when it is determined that the content record including the application ID of the target application record is not registered in the content list (S34: No), the operation instruction program 65 executes process of S36 and thereafter without executing process of S35. Also, when it is determined that the editing-in-progress data is not stored in the memory area indicated by the path information of the target application record (S36: No), the operation instruction program 65 executes process of S38 and thereafter without executing process of S37.

Then, the operation instruction program 65 determines whether the application record, which has not been read yet in S31, is registered in the application list (S38). When it is determined that there is the application record that has not been read yet (S38: Yes), the operation instruction program 65 executes the process of S31 and thereafter. That is, the operation instruction program 65 executes the process of S31 to S37 for each of the application records registered in the application list.

When the operation instruction program 65 executes the process of S31 to S37 for all the application records registered in the application list (S38: No), the operation instruction program 65 ends the image generation process. In the illustrative embodiment, after the image generation process is over, the main screen further includes an application icon 124 associated with the application ID "GREETING CARD", and an editing-in-progress icon 128 associated the application ID "GREETING CARD" and the content ID for identifying the editing-in-progress data of the path information "GREETING CARD FOLDER", in addition to the diverse icons.

Figure 7B:
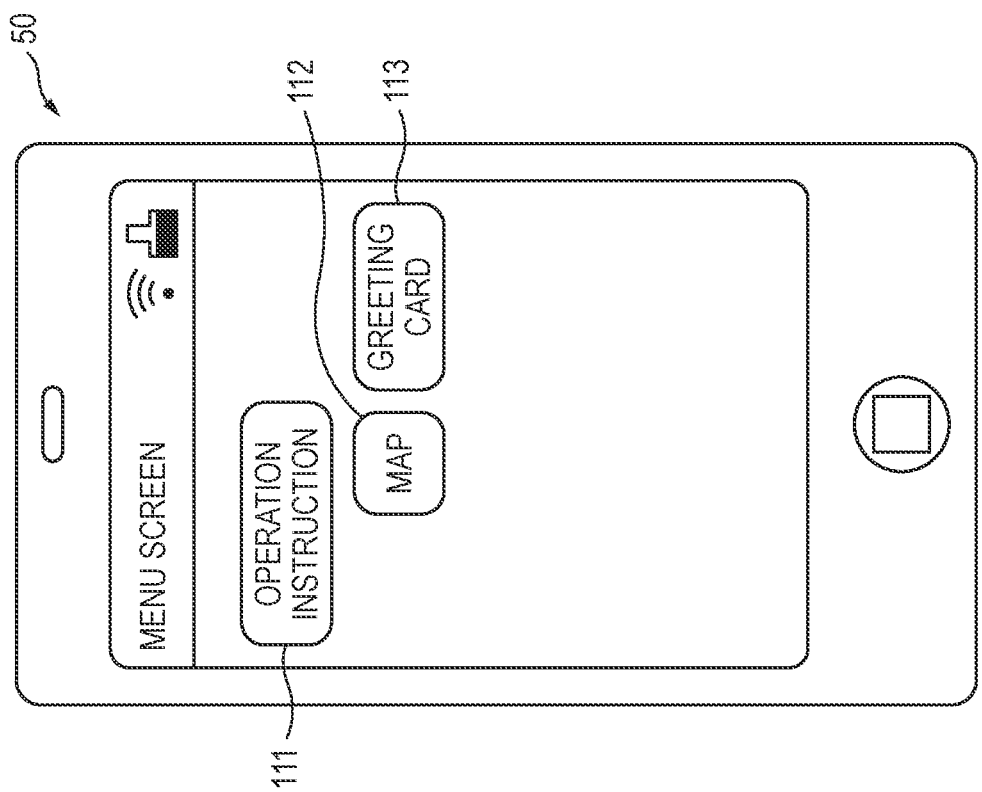
FIG. 7B depicts an example of a main screen on the display.

Returning to FIG. 3, the operation instruction program 65 displays a main screen shown in FIG. 7B on the display 53 (S12). The main screen is an example of the first screen including the operation icons 121, 122, the application icons 123, 124, the thumbnail icons 125, 126, the editing-in-progress icons 127, 128, and the switching icon 129. The operation instruction program 65 receives an input operation on the main screen, through the user I/F 54 (S13 to S16). The process of S12 is an example of the first display process, and the process of S13 to S16 is an example of the first operation reception process.

The operation icon 121 corresponds to the print operation, and the operation icon 122 corresponds to the FAX transmission operation. The application icons 123, 124, the thumbnail icons 125, 126, and the editing-in-progress icons 127, 128 are icons added in S11. The thumbnail icons 125, 126 and the editing-in-progress icons 127, 128 are examples of the content object (hereinafter, also referred to as "content icon"). The switching icon 129 corresponds to an instruction to switch the designated apparatus. The switching icon 129 is described thereon with the designated apparatus ID "MFP-A" stored in the memory 62. On the other hand, when the designated apparatus ID is not stored in the memory 62, the switching icon 129 is described thereon with a character string "NOT SELECTED" indicating that the designated apparatus has not been selected yet.

The operation instruction program 65 generates main screen data to express the main screen shown in FIG. 2B by synthesizing the operation icon 121, 122 and the switching icon 129 always included in the main screen and the icon associated with the addition flag "ON" in S11 into a background image of the main screen, for example, in S12. Then, the operation instruction program 65 may instruct the OS 64 to execute the process of displaying, on the display 53, the main screen expressed by the main screen data, via the API.

Then, when a designation operation of designating the switching icon 129, for example, is received through the user I/F 54 (S13: Yes), the operation instruction program 65 searches the plurality of MFPs 10 capable of performing communication through the communication I/F 55 (S17). Specifically, the operation instruction program 65 broadcasts transmission request information to the communication network 101 through the communication I/F 55 by using an SNMP (abbreviation of Simple Network Management Protocol). Then, the operation instruction program 65 receives the apparatus ID transmitted by the MFP 10, as a response to the transmission request information, through the communication I/F 55. That is, the operation instruction program 65 specifies the MFP 10, which is a transmission source of the apparatus ID, as the MFP 10 capable of performing communication. In the meantime, as the method of searching the MFP 10 which can perform communication, the other well-known methods can also be adopted.

Then, the operation instruction program 65 displays a device selection screen (not shown) on the display 53 (S18). The device selection screen includes a device icon corresponding to the apparatus ID of the MFP 10 detected in S17. Then, the operation instruction program 65 receives an input operation on the device selection screen through the user I/F 54 (S19). The process of S19 is an example of the fourth operation reception process.

Then, when a designation operation of designating the device icon is received through the user I/F 54 (S19: Yes), the operation instruction program 65 stores, in the memory 62, the apparatus ID corresponding to the designated device icon, as the designated apparatus ID (S20). On the other hand, when the designated apparatus ID has been already stored in the memory 62, the operation instruction program 65 overwrites the designated apparatus ID with the new designated apparatus ID. The process of S20 is an example of the third storing process. Then, the operation instruction program 65 again displays the main screen on the display 53 (S12).

Also, when a designation operation of designating the application icon 123, for example, is received through the user I/F 54 (S14: Yes), the operation instruction program 65 activates the map program 66 (denoted as "target application", in FIG. 3) identified with the application ID "MAP" corresponding to the designated application icon 123 (S21). The operation instruction program 65 may designate, as an argument, the application ID "MAP" corresponding to the application icon 123, for example, and activate the activation API. In the meantime, in S21, the content ID is not designated as an argument of the activation API. The process of S21 is an example of the first activation process of activating an external program so as to enable the external program to newly generate the content data.

When the activation API is activated, the OS 64 switches the operation instruction program 65 to the background, and activates the map program 66 identified with the application ID "MAP" designated as an argument so as to execute the same at the foreground. The activated map program 66 executes content editing process, which will be described later with reference to FIG. 6. Also, when the content editing process is over, the OS 64 ends the map program 66, and executes the operation instruction program 65 at the foreground. Then, the operation instruction program 65 switched to the foreground executes process of S43 and thereafter, which will be described later with reference to FIGS. 5A and 5B.

Also, when a designation operation of designating the content icon is received through the user I/F 54 (S15: Yes), the operation instruction program 65 executes content output process (S22). The content output process is process of outputting content data associated with the designated content icon, in conjunction with the external program. The content output process is described in detail with reference to FIGS. 5A and 5B.

First, a case where the editing-in-progress icon 127 of the content icons shown in FIG. 7B is designated is described. When the editing-in-progress icon 127 is designated (S41: Yes), the operation instruction program 65 designates, as an argument, the application ID "MAP" associated with the designated editing-in-progress icon 127 and the content ID "EDITING-IN-PROGRESS" preset so as to indicate the editing-in-progress data, and executes the activation API (S42). The process of S43 that is executed while designating the content ID "EDITING-IN-PROGRESS" is an example of the third activation process of activating the external program having generated the editing-in-progress data so as to edit the editing-in-progress data. Thereby, the map program 66 executes the content editing process, like S21.

Then, the operation instruction program 65 acquires the application ID "MAP", a content ID "003", and content data from the map program 66, as a return value of the activation API (S43). The content ID "003" is a content ID acquired by the map program 66 in S68 (which will be described later) so as to identify the editing-in-progress data as content data. The content data is data edited by the map program 66 in the most-recent content editing process and stored in the memory 62 in S68. In the meantime, the description "the content data is acquired as a return value" includes acquiring, as a return value, a pointer indicative of a head address of a storage area of the memory 62 in which the content data is stored, and reading out the content data from the storage area indicated by the acquired pointer. The process of S43 is an example of the second data reception process, and the content data acquired in S43 is an example of the target content data received in the second data reception process.

Then, the operation instruction program 65 acquires thumbnail image data "THUMBNAIL 003.JPG" from the content data acquired in S43. Specifically, the operation instruction program 65 reads out thumbnail image data of a JPEG format generated by the map program 66, from a header of the content data generated by the map program 66. As another example, the operation instruction program 65 may generate the thumbnail image data to express a thumbnail image by reducing a resolution of a content image expressed by the content data acquired from the map program 66, trimming a part of the content image to a size and a shape of the thumbnail icon or combining the image process. This process is an example of the thumbnail reception process.

Then, the operation instruction program 65 adds, to the content list, a content record including the application ID "MAP" and the content ID "003" acquired in S43, the generated thumbnail image data "THUMBNAIL 003.JPEG", the print flag for which the fourth value "NOT YET" is set, and the condition information "CONDITION A" of a preset default (S44). The process of S44 is an example of the first storing process.

Then, the operation instruction program 65 converts the content data acquired in S43 into print data by using the condition information "CONDITION A" (S45). This process is an example of the conversion process. Then, the operation instruction program 65 associates and stores, in the memory 62, the application ID "MAP" and the content ID "001" acquired in S43 and the print data "PRINT DATA A" converted in S45, as a set, as shown in FIG. 2C, for example. On the other hand, when the set of the application ID, the content ID, and the print data has been already stored in the memory 62, the operation instruction program 65 overwrites the set with the new set. This process is an example of the overwriting process. That is, the set shown in FIG. 2C is overwritten whenever the content data is acquired from the external program (S43, S55).

As an example, a case where the content data of a PDF format is converted into the print data by using the execution conditions (size "A4", sheet type "normal sheet", and color "monochrome") indicated by the condition information "CONDITION A" is described. First, the operation instruction program 65 converts the content data of a PDF format into a JPEG format. This process may be executed by the operation instruction program 65 or may be executed by a server (not shown) on the Internet. Also, the operation instruction program 65 enlarges or reduces a content image expressed by the content data converted into a JPEG format to A4 size. Also, the operation instruction program 65 converts a color tone of each pixel of the content image into a gray scale.

Like this, the conversion from the content data into the print data may include the process in which the condition information is not used, so as to convert a format from a PDF format into a JPEG format. Also, the condition information may include a parameter such as a sheet type "normal sheet", which is not used when converting the content data into the print data. Also, the process of converting the content data into the print data is not limited to the above example. As another example, when converting the content data including a plurality of content images into the print data by using the condition information including a parameter "Nin1" of an item "aggregation", the operation instruction program 65 may aggregate N content images included in the content data and convert the aggregated images into the print data for recording the same to one sheet.

Figure 8B:
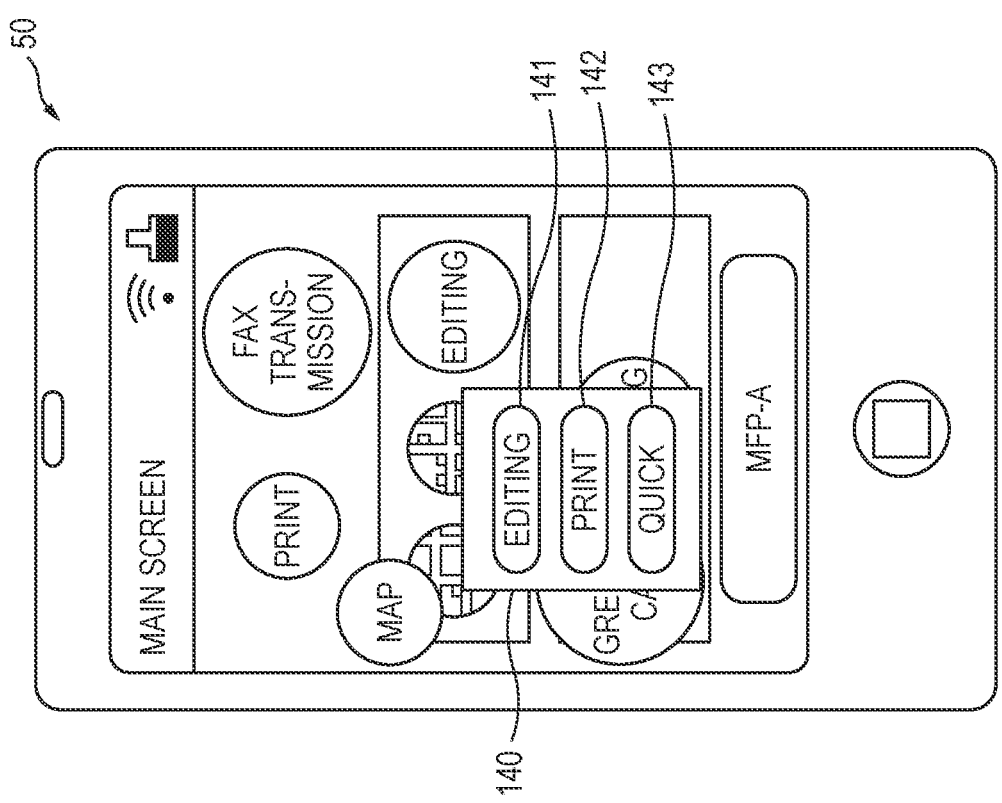
FIG. 8B depicts an example of a menu window superimposed on the main screen on the display.
Figure 8A:
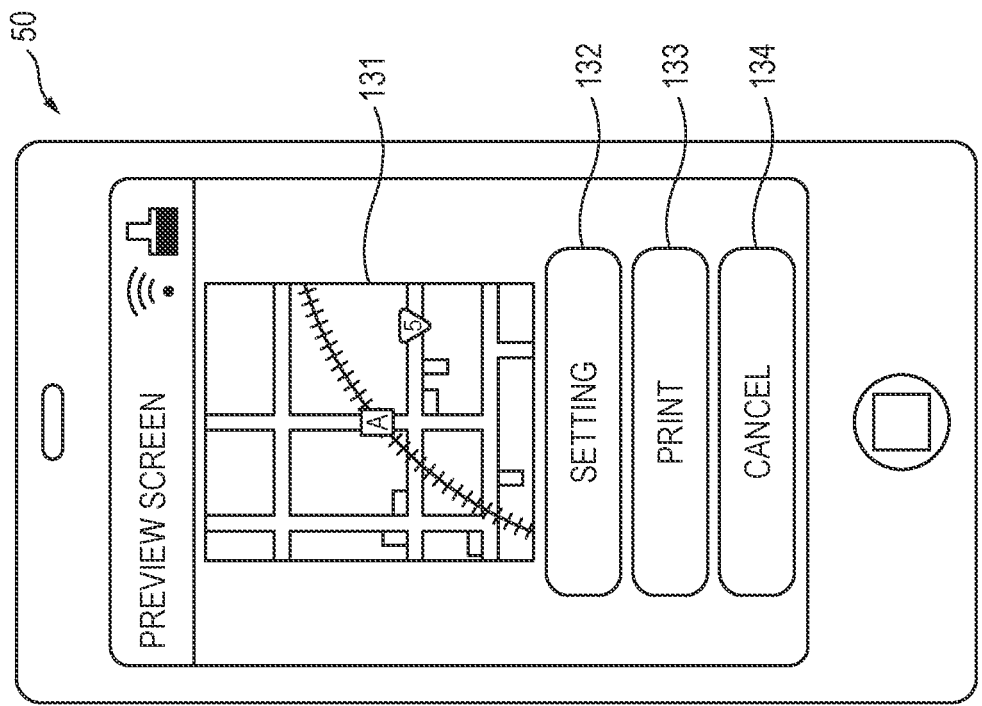
FIG. 8A depicts an example of a preview screen on the display.

Then, the operation instruction program 65 displays a preview screen shown in FIG. 8A on the display 53 (S46). The preview screen is an example of the third screen including a preview image 131, a [setting] icon 132, a [print] icon 133, and a [cancel] icon 134. The preview image 131 is an image indicating a state where an image expressed by the print data acquired in S45 is recorded on a sheet. In the meantime, since the print data is data converted from the content data, it can be said that the preview image 131 is an image indicating a state where a content image expressed by the content data is recorded on a sheet. Then, the operation instruction program 65 receives an input operation on the preview screen, through the user I/F 54 (S47). The process of S46 is an example of the third display process, and the process of S47 is an example of the third operation reception process.

When a designation operation of designating the [setting] icon 132 is received through the user I/F 54 (S47: setting), the operation instruction program 65 receives a change operation of changing the condition information of the content record added in S44, through the user I/F 54 (S50). Then, the operation instruction program 65 executes the process of S45 and thereafter by using the changed condition information. That is, the print data is generated using the changed condition information, and the print data stored in the memory 62 is overwritten with the newly generated print data. That is, the set shown in FIG. 2C is overwritten whenever the condition information is changed.

Also, when a designation operation of designating the [print] icon 133 is received through the user I/F 54 (S47: print), the operation instruction program 65 transmits print instruction information to the MFP 10 identified with the designated apparatus ID "MFP-A" stored in the memory 62, through the communication I/F 55 (S48). The print instruction information is an example of the output instruction information for instructing execution of the print operation in accordance with the print data generated in previous S45. That is, the print instruction information includes the print data stored in the memory 62. The tapping of the [print] icon 133 is an example of the confirmation operation indicating that the preview image 131 has been checked. The process of S48 is an example of the output instruction process.

In the meantime, the operation instruction program 65 may execute the process of overwriting the set shown in FIG. 2C immediately after the process of S48, instead of the timing at which the process of S45 is executed. That is, the operation instruction program 65 may associate and store, in the memory 62, the print data transmitted in S48, the content ID of the content data, which is a source of the print data, and the application ID of the external program, which is a provision source of the content data, as a set.

In the meantime, although not shown, the apparatus program 35 of the MFP 10 receives the print instruction information from the portable terminal 50 through the communication I/F 25. Then, the apparatus program 35 enables the printer 11 to execute the print operation, in accordance with the received print instruction information. That is, the printer 11 records an image, which is expressed by the print data included in the print instruction information, on a sheet. In the meantime, since the print data is data converted from the content data, it can be said that the print operation is an operation of recording a content image, which is expressed by the content data, on a sheet.

In response to the execution of the process of S48, the operation instruction program 65 sets the third value "COMPLETION" for the print flag of the content record added in S44 (S49). The process of S49 is an example of the second storing process. On the other hand, when a designation operation of designating the [cancel] icon 134 is received through the user I/F 54 (S47: cancel), the operation instruction program 65 ends the content output process without executing the process of S48 and S49. In this case, the print flag of the content record added in S44 is kept as the fourth value "NOT YET" is set.

Subsequently, a case where the thumbnail icon 125 of the content icons shown in FIG. 7B is designated is described. When a designation operation of designating the thumbnail icon 125 shown in FIG. 7B is received through the user I/F 54 (S15: Yes→S22→S41: No), the operation instruction program 65 determines the setting value of the print flag of the content record including the application ID "MAP" and the content ID "001" associated with the thumbnail icon 125 (S51). The process of S51 is an example of the third determination process.

Then, when it is determined that the third value "COMPLETION" is set for the print flag (S51: completion), the operation instruction program 65 displays a menu window 140 shown in FIG. 8B on the display 53 (S52). The menu window 140 is an example of the second screen including an [editing] icon 141, which is an example of the editing object, a [print] icon 142, which is an example of the output object, and a [quick] icon 143, which is an example of the immediate output object. Also, the menu window 140 is a popup window that is displayed with being superimposed on the main screen.

On the other hand, when it is determined that the fourth value "NOT YET" is set for the print flag (S51: not yet), the operation instruction program 65 displays, on the display 53, the menu window 140, which includes the [editing] icon 141 and the [print] icon 142 and does not include the [quick] icon 143 (S53). Then, the operation instruction program 65 receives an input operation on the menu window 140 displayed in S52, S53, through the user I/F 54 (S54). The process of S52 and S53 is an example of the second display process, and the process of S54 is an example of the second operation reception process.

Then, when a designation operation of designating the [editing] icon 141 is received through the user I/F 54 (S54: editing), the operation instruction program 65 designates, as an argument, the application ID "MAP" and the content ID "001" associated with the thumbnail icon 125, and executes the activation API (S42). The process of S42 that is executed while designating the content ID associated with the thumbnail icon 125 is an example of the second activation process of activating the external program having generated the content data, so as to edit the content data identified with the content ID. The process of S42 and thereafter is common to the process that is executed when the editing-in-progress icon 127 is tapped.

Also, when a designation operation of designating the [print] icon 142 is received through the user I/F 54 (S54: print), the operation instruction program 65 acquires the content data identified with the content ID "001" associated with the thumbnail icon 125, from the map program 66 identified with the application ID "MAP" associated with the thumbnail icon 125 (S55). The process of S55 is an example of the first data reception process, and the content data acquired in S55 is an example of the target content data received in the first data reception process. Then, the operation instruction program 65 executes the process of S45 and thereafter by using the target content data acquired in S55.

In S55, for example, the operation instruction program 65 may designate, as an argument, the application ID "map" and content ID associated with the thumbnail icon 125, and execute an acquisition API. Then, the operation instruction program 65 may acquire the content data, which is read out from the memory 62 by the map program 66, as a return value of the acquisition API. The content data acquired in S55 is previous content data, which was generated in the past by the external program, and is target content data, which is a target of the print operation.

Also, when a designation operation of designating the [quick] icon 143 is received through the user I/F 54 (S54: quick), the operation instruction program 65 determines whether the set including the application ID "MAP" and the content ID "001" associated with the thumbnail icon 125 is stored in the memory 62 (S56). When a plurality of sets is stored in the memory 62, the operation instruction program 65 may determine whether the plurality of sets includes the set including the application ID "MAP" and the content ID "001" associated with the thumbnail icon 125. The process of S56 is an example of the fourth determination process.

Figure 9A:
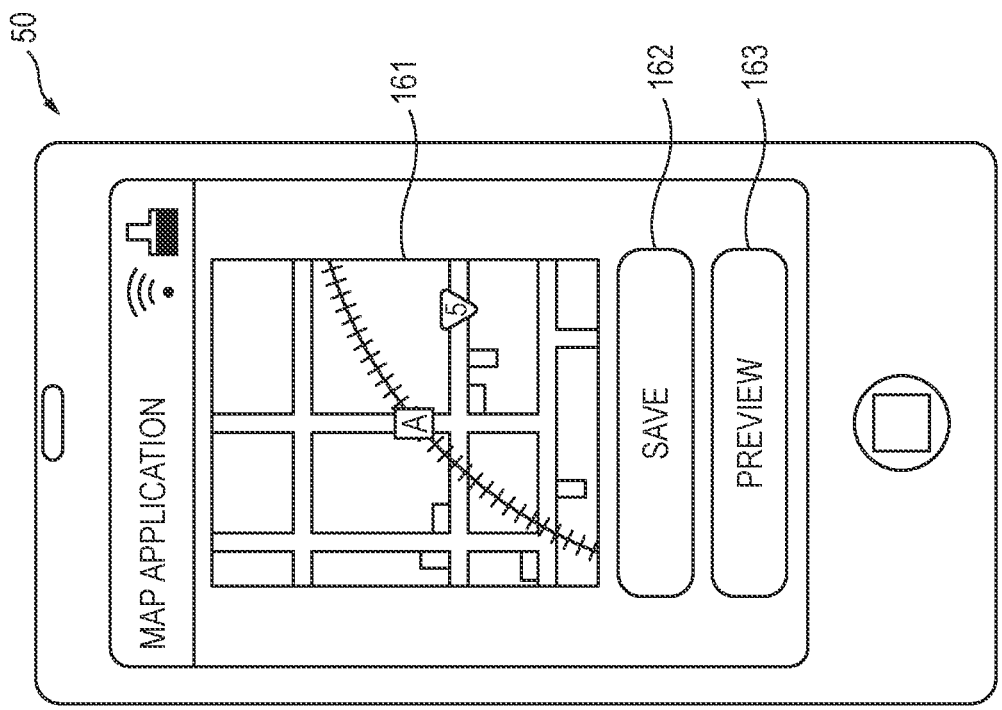
FIG. 9A depicts an example of a progressing window superimposed on the main screen on the display.

When it is determined that the set including the application ID "MAP" and the content ID "001" is not stored in the memory 62 (S56: No), the operation instruction program 65 executes the process of S55 and thereafter. On the other hand, when it is determined that the set including the application ID "MAP" and the content ID "001" is stored in the memory 62 (S56: Yes), the operation instruction program 65 executes the process of S48 and thereafter by using the print data included in the set and displays a progressing window 150 shown in FIG. 9A on the main screen, without executing the process of S55, S45 to S47 and S50. That is, when the set shown in FIG. 2C is stored in the memory 62, the operation instruction program 65 executes the process of "S56: Yes" and thereafter. The progressing window 150 includes a message "NOW PRINTING", for example. Also, the display of the progressing window 150 is over at timing at which the transmission of the print instruction information is over, for example.

Returning to FIG. 3, when a designation operation of designating the operation icon 121 is received through the user I/F 54 (S16: Yes), the operation instruction program 65 execute print process, which is one of the operation instruction process (S23). Although the print process is not shown, the operation instruction program 65 receives a designation operation of designating, as the designated data, one of the plurality of data stored in the data folder of the memory 62, through the user I/F 54. Then, the operation instruction program 65 transmits the print instruction information for the designated data to the MFP 10 identified with the designated apparatus ID, through the communication I/F 55. The process of the MFP 10 having received the print instruction information is common to the description of S48.

Also, when a designation operation of designating the operation icon 122 is received through the user I/F 54 (S16: Yes), the operation instruction program 65 executes FAX transmission process, which is one of the operation instruction process (S23). Although the FAX transmission process is not shown, the operation instruction program 65 receives a designation operation of designating, as the designated data, one of the plurality of data stored in the data folder of the memory 62 and a designation operation of designating, as the designated FAX number, one of a plurality of FAX numbers stored in the memory 62, through the user I/F 54. Then, the operation instruction program 65 transmits FAX transmission instruction information including the designated data and the designated FAX number to the MFP 10 identified with the designated apparatus ID, through the communication I/F 55.

In the meantime, although not shown, the apparatus program 35 of the MFP 10 receives the FAX transmission instruction information from the portable terminal 50 through the communication I/F 25. Then, the apparatus program 35 enables the FAX I/F 13 to execute a FAX transmission operation in accordance with the received FAX transmission instruction information. That is, the FAX I/F 13 FAX-transmits the designated data included in the FAX transmission instruction information to the external apparatus identified with the designated FAX number included in the FAX transmission instruction information.

[Operations of Map Program 66]

Figure 6:
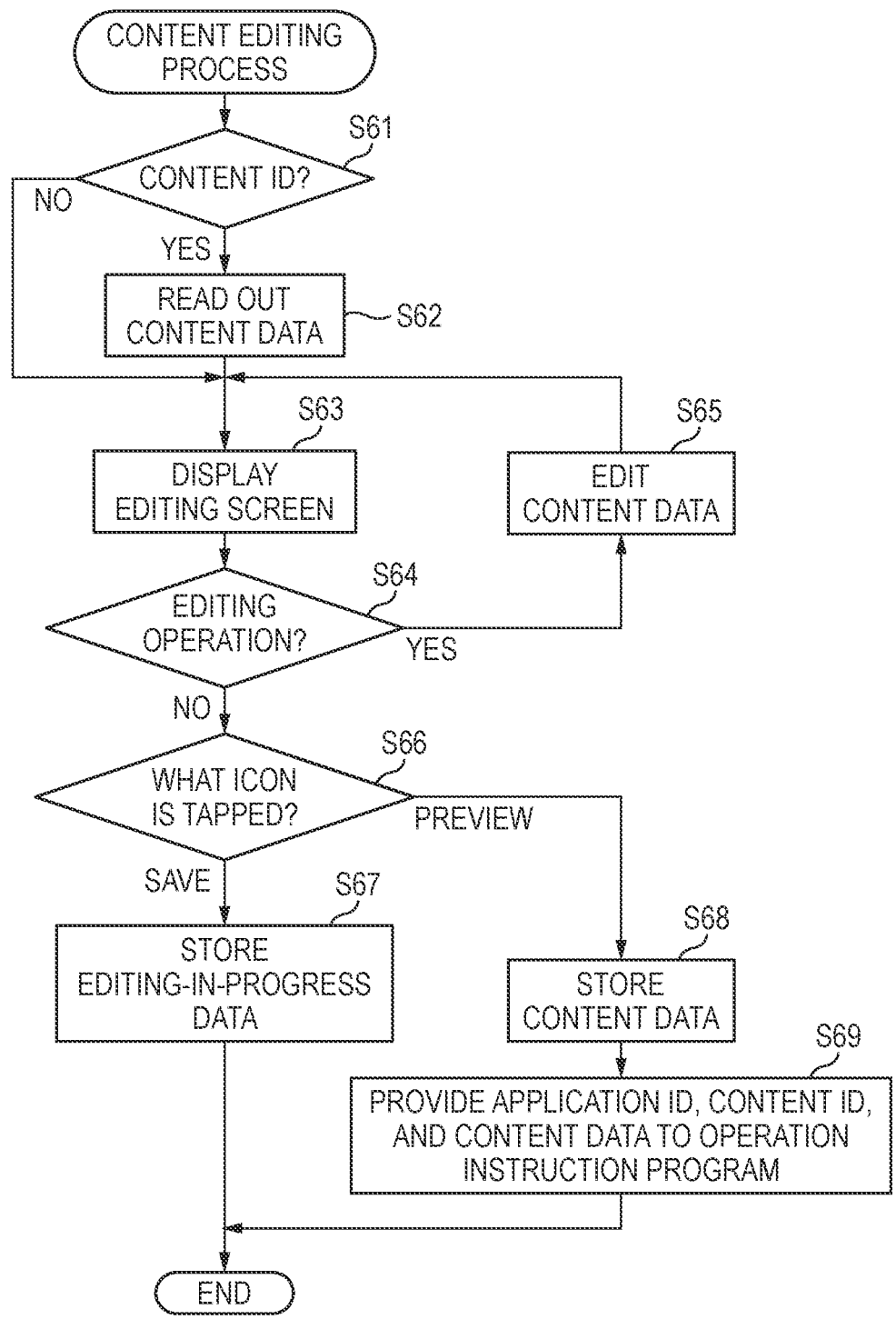
FIG. 6 is a flowchart of content editing process.

Subsequently, the content editing process that is to be executed by the map program 66 is described in detail with reference to FIG. 6. First, the map program 66 determines whether the content ID has been acquired as an activation argument (S61). The map program 66 does not acquire the content ID when it is activated through the menu screen shown in FIG. 7A and when it is activated in S21 of FIG. 3. On the other hand, when the map program 66 is activated in S42 of FIGS. 5A and 5B, it acquires the designated content ID, as an argument of the activation API.

Then, when it is determined that the content ID has been acquired from the operation instruction program 65 (S61: Yes), the map program 66 reads out the content data identified with the content ID or the editing-in-progress data from the memory 62 (S62). In the meantime, when the content data is read out from the memory 62, the map program 66 overwrites the editing-in-progress data, which has been already stored in the memory area indicated by the path information "map folder", with the content data, as the new editing-in-progress data. On the other hand, when it is determined that the content ID has not been acquired (S61: No), the map program 66 executes process of S63 and thereafter without executing the process of S62.

Figure 9B:
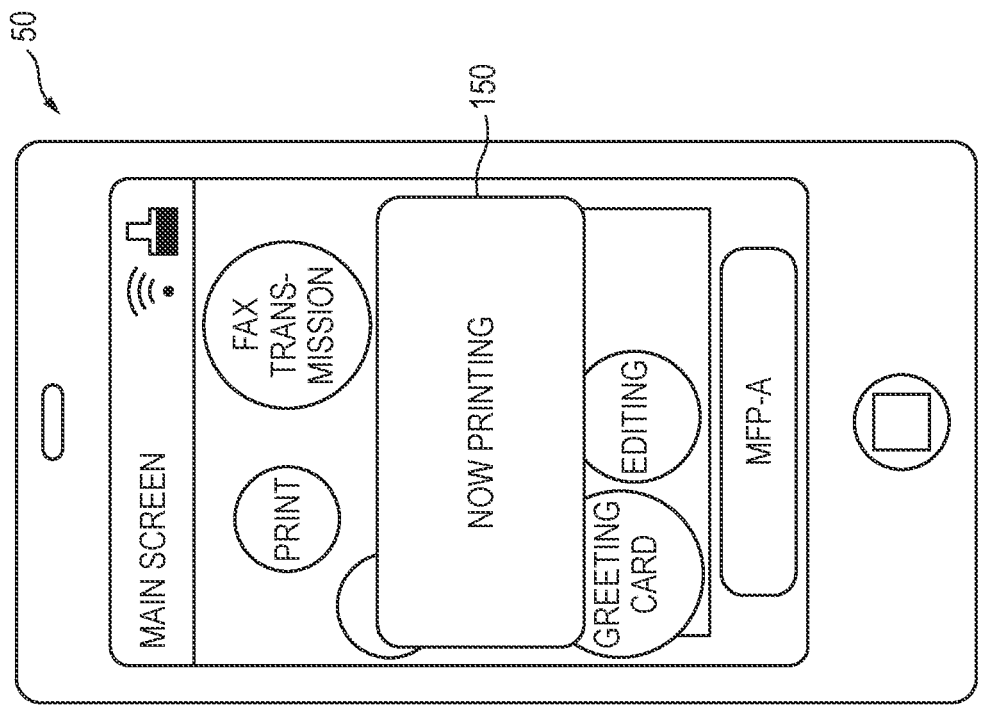
FIG. 9B depicts an example of an editing screen displayed by a map program on the display.

Then, the map program 66 displays an editing screen shown in FIG. 9B on the display 53 (S63). The editing screen includes a map image 161, a [save] icon 162, and a [preview] icon 163. The map image 161 that is displayed when the content ID has not been acquired is an image (for example, a map including a current position of the portable terminal 50) that is expressed by the map image data received from the server (not shown). Specifically, the map program 66 converts the map image data into editing-in-progress data of a data format, which can be easily edited by the map program 66, and displays an image, which is expressed by the editing-in-progress data, as the map image 161. On the other hand, the map image 161 that is displayed when the content ID has been acquired is an image that is expressed by the editing-in-progress data stored in the memory area indicated by the path information "MAP FOLDER". Then, the map program 66 receives an input operation on the editing screen through the user I/F 54 (S64).

Then, when an editing operation on a position of the map image 161 is received through the user I/F 54 (S64: Yes), the map program 66 receives map image data corresponding to the received editing operation from the server (not shown) (S65). That is, the map program 66 transmits transmission request information for requesting transmission of new map image data to the server (not shown) through the communication I/F 55, and receives the map image data, which is transmitted from the server (not shown) as a response to the transmission request information, through the communication I/F 55. Then, the map program 66 displays, on the display 53, an editing screen including the new map image 161 that is expressed by the map image data received in S65 (S63).

As an example of the editing operation requiring transmission of the new map image data, a slide operation on the position of the map image 161 is an editing operation of moving an area on a map included in the map image 161 on the basis of a slide direction of an input medium. As another example, a pinch-in operation on the position of the map image 161 is an editing operation of reducing a map to be expressed in the map image 161. Also, as another example, a pinch-out operation on the position of the map image 161 is an editing operation of enlarging a map to be expressed in the map image 161.

Also, when an editing operation of instructing an addition of a text to the map image 161 or an editing operation of instructing an addition of a mark to the map image 161 is received, the map program 66 adds a text or a mark to the map image 161 in accordance with the received editing operation. When adding a text or a mark to the map image 161, it is not necessary to request transmission of the new map image data. Also, whenever editing the map image data in S65, the map program 66 overwrites the editing-in-progress data, which has been already stored in the storage area indicated by the path information "MAP FOLDER", with the edited editing-in-progress data.

Also, when a designation operation of designating the [save] icon 162 is received through the user I/F 54 (S64: No&S66: save), the map program 66 stores the editing-in-progress data, which expresses the map image 161 being displayed, in the memory area indicated by the path information "MAP FOLDER" (S67), and ends the content editing process. In this case, the OS 64 displays the menu screen shown in FIG. 7A on the display 53 without executing the operation instruction program 65 at the foreground.

Also, when a designation operation of designating the [preview] icon 163 is received through the user I/F 54 (S64: No&S66: preview), the map program 66 stores the editing-in-progress data stored in the storage area indicated by the path information "MAP FOLDER", in a preset memory area different from the storage area indicated by the path information "MAP FOLDER", as the content data (S68). Then, the map program 66 provides the application ID "MAP", the content ID for identifying the content data stored in S68 and the content data stored in S68 to the operation instruction program 65 (S69), and ends the content editing process.

In the meantime, when the content ID of the content data is acquired as an activation argument, the map program 66 may overwrite the content data already stored with being associated with the content ID in the memory 62 with the editing-in-progress data stored in the memory area indicated by the path information "MAP FOLDER", in S68. Alternatively, the map program 66 may receive a designation operation of designating one of the overwriting save and the new save, through the user I/F 54. When the overwriting save is designated, the map program 66 may execute the above process. On the other hand, when the new save is designated, the map program 66 may store the content data in the memory 62 in association with the newly acquired content ID. Also, when the content ID "EDITING-IN-PROGRESS" is acquired as an activation argument, or when the content ID is not acquired as an activation argument, the map program 66 may store the content data in the memory 62 in association with the newly acquired content ID, in S68.

In the meantime, the map program 66 activated in S21, S42 may provide a variety of information, as a return value of the activation API, for example. On the other hand, the map program 66 activated through the menu screen may provide a variety of information by using an intent function provided by the OS 64, for example. In this case, the OS 64 executes the operation instruction program 65 at the foreground. Then, the operation instruction program 65 switched to the foreground executes the process of S43 and thereafter.

Technical Effects of Illustrative Embodiment

According to the above illustrative embodiment, the user who wants the external program to newly generate the content data has only to tap the application icons 123, 124, and the user who wants to execute the print operation for the previous content data has only to tap the thumbnail icon 125, 126. Thereby, for example, as compared to a configuration where the application icon 123 is tapped to activate the map program 66 and the map program 66 is thus enabled to read out the previous content data, and the [preview] icon 163 is tapped to take over the previous content data to the operation instruction program 65, it is possible to implement the desired result with the less input operations.

Also, since the thumbnail icons 125, 126 are configured by the thumbnail images, it is possible to enable the user to recognize the content of the content data through the main screen. Also, it is possible to enable the user to recognize the content data that is being edited by the external program, through the editing-in-progress icons 127, 128, and to resume the editing of the editing-in-progress data by tapping the editing-in-progress icons 127, 128. That is, it is possible to implement the desired result with the less input operations.

Also, according to the above illustrative embodiment, it is possible to enable the user to select one of the re-editing and print of the content data by the [editing] icon 141 and the [print] icon 142 of the menu window 140. That is, it is possible to implement the desired result with the less input operations. Also, since the process of S46 and S47 is omitted by tapping the [quick] icon 143, it is possible to further simplify the input operation when re-printing the previously printed content data. Also, when re-printing the content data of which the print data is stored in the memory 62, for example, the process of S55 and S44 is omitted. Therefore, it is possible to shorten the time after the [quick] icon 143 is tapped until the print operation is started.

In the meantime, the method of selecting one of the re-editing and print of the content data is not limited to the above example. As another example, the operation instruction program 65 may determine whether the designated apparatus ID is stored in the memory 62, instead of the process of S51 to S54. This process is an example of the sixth determination process. When it is determined that the designated apparatus ID is stored in the memory 62, the operation instruction program 65 may execute the process of S55 and thereafter. On the other hand, when it is determined that the designated apparatus ID is not stored in the memory 62, the operation instruction program 65 may execute the process of S42 and thereafter.

Figure 10B:
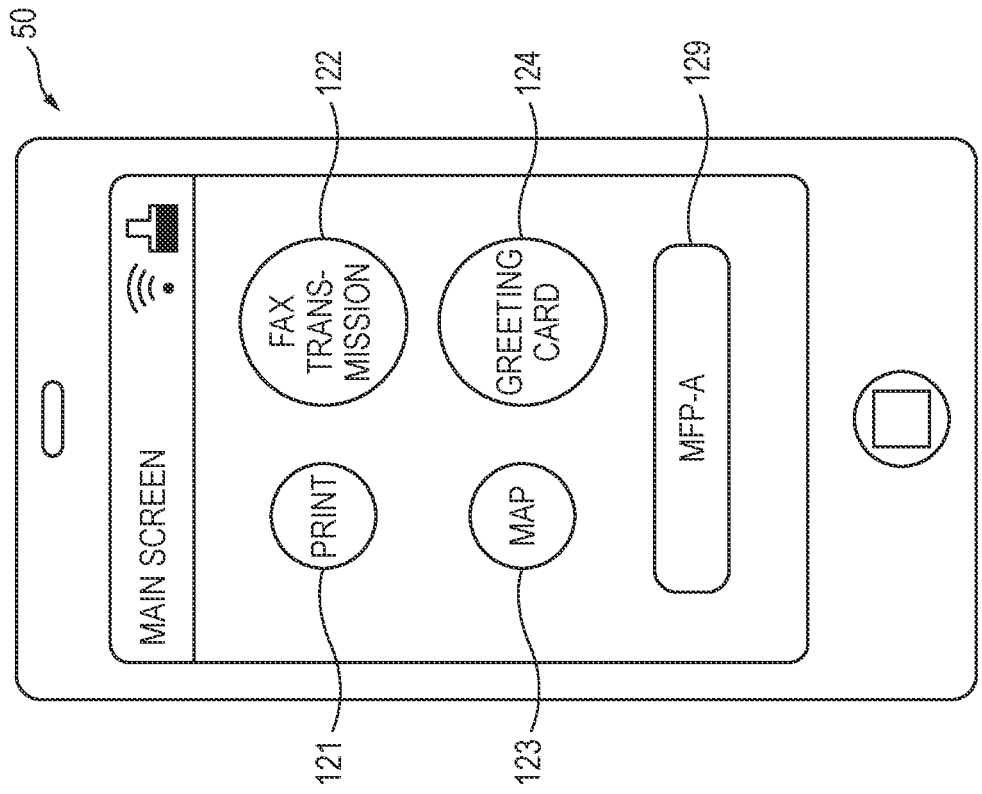
FIG. 10B depicts an example of a content selection screen on the display.
Figure 10A:
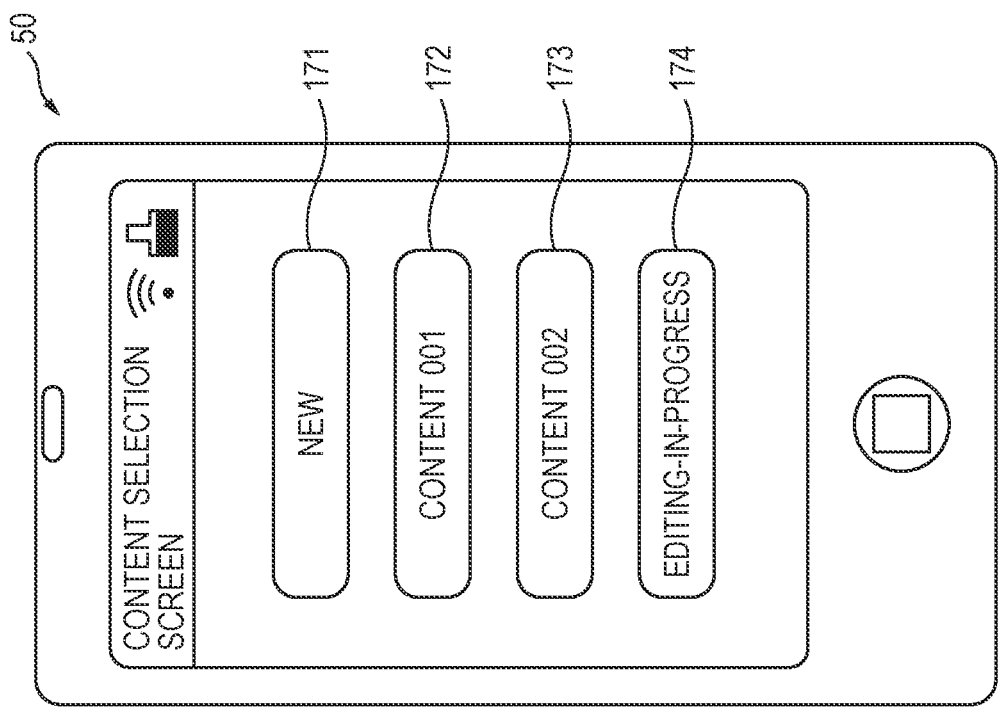
FIG. 10A depicts an example of another form of the main screen on the display.

Also, the method of displaying the application icons 123, 124, the thumbnail icons 125, 126 and the editing-in-progress icons 127, 128 is not limited to the example of FIG. 7B. As another example, as shown in FIG. 10A, the operation instruction program 65 may display a main screen including the operation icons 121, 122, the application icons 123, 124 and the switching icon 129 on the display 53. Then, when a designation operation of designating the application icon 123 of FIG. 10A is received through the user I/F 54, the operation instruction program 65 may display a content selection screen including a [new] icon 171 and content icons 172, 173, 174 on the display 53, as shown in FIG. 10B. The [new] icon 171 corresponds to the new generation of the content data, the content icons 172, 173 correspond to the content records of FIG. 2B, and the content icon 174 corresponds to the editing-in-progress data.

Then, when a designation operation of designating the [new] icon 171 is received through the user I/F 54 (S14: Yes), the operation instruction program 65 may execute the process of S21. Also, when a designation operation of designating one of the content icons 172, 173 is received through the user I/F 54 (S15: Yes S22 S41: No), the operation instruction program 65 may execute the process of S51 and thereafter. Also, when a designation operation of designating the content icon 174 is received through the user I/F 54 (S15: Yes S22 S41: Yes), the operation instruction program 65 may execute the process of S42 and thereafter.

Also, in the MFP 10 and the portable terminal 50 of the above illustrative embodiment, the diverse programs stored in the memories 32, 62 are executed by the CPUs 31, 61, so that the respective process to be executed by the controller of the present disclosure is implemented. However, the configuration of the controller is not limited thereto and some or all of the controller may be implemented by the hardware such as an integrated circuit and the like.

Also, the present disclosure can be implemented as not only the MFP 10 and the portable terminal 50 but also a program configured to enable the MFP 10 and the portable terminal 50 to execute the process. The program may be provided with being recorded in a non-transitory recording medium. The non-transitory recording medium may include a memory mounted on a server that can be connected to the MFP 10 and the portable terminal 50 through the communication network 101, in addition to a CD-ROM, a DVD-ROM and the like. The program stored in the memory of the server may be transmitted through the communication network 101 such as the Internet, as information or signal indicative of the program.

What is claimed is:

1. A non-transitory computer-readable medium having a program stored thereon and readably by a computer of a portable terminal comprising a memory, a display, a user interface, and a communication interface, and enabling to execute an external program that can be installed to the portable terminal and is configured to generate content data in accordance with an input operation received through the user interface,
   wherein the program is a program configured to transmit output instruction information that instructs to execute an output operation of outputting content data, to an output apparatus through the communication interface,
   wherein the program, when executed by the computer, causes the portable terminal to perform:
      a first determination process of determining whether previous content data is stored in the memory, the previous content data being content data previously generated by the external program,
      a second determination process of determining whether each of a plurality of the external programs is installed in the portable terminal, the plurality of external programs including the external program that generated the previous content data;
      a first display process of displaying, on the display, a first screen including, on the same screen, a program object for activating the external program determined to be installed by the second determination process and a content object corresponding to the previous content data determined as stored in the memory in the first determination process; and
      a first operation reception process of receiving an input operation on the first screen through the user interface,
   wherein the program causes the portable terminal to perform, when the program object is designated by the input operation on the first screen in the first operation reception process, a first activation process of activating the external program so as to cause the external program corresponding to the program object to newly generate the content data, and
   wherein the program causes the portable terminal to perform when the program object is not designated and the content object is designated by the input operation on the first screen in the first operation reception process:
      a first data reception process of receiving, as target content data, the previous content data corresponding to the content object from the external program that generates the previous content data;
      an output instruction process of transmitting the output instruction information that instructs to execute the output operation for the target content data, to the output apparatus through the communication interface;
   wherein the program further causes the portable terminal to perform:
      a second data reception process of receiving, as the target content data, the content data most recently generated by the external program from the external program;
      a thumbnail reception process of receiving thumbnail image data generated based on the target content data received in the second data reception process, the thumbnail image data being image data indicating a thumbnail image of the target content data; and
      a first storing process of storing, in the memory, a content ID for identifying the target content data received in the second data reception process, a program ID for identifying the external program that generates the target content data in association with each other, and the thumbnail image data received in the thumbnail reception process in association with the content ID and the program ID;
   wherein the output instruction process transmits the output instruction information that instructs to execute the output operation for the target content data received in the second data reception process, to the output apparatus through the communication interface, and
   wherein the first determination process determines whether the content ID associated with the program ID of the external program determined as installed in the portable terminal in the second determination process is stored in the memory, and
   wherein the first display process includes displaying, on the first screen, the thumbnail image indicated by the thumbnail image data associated with the content ID determined as stored in the memory in the first determination process, as the content object.

2. A non-transitory computer-readable medium having a program stored thereon and readably by a computer of a portable terminal comprising a memory, a display, a user interface, and a communication interface, and enabling to execute an external program that can be installed to the portable terminal and is configured to generate content data in accordance with an input operation received through the user interface,
   wherein the program is a program configured to transmit output instruction information that instructs to execute an output operation of outputting content data, to an output apparatus through the communication interface,
   wherein the program, when executed by the computer, causes the portable terminal to perform:
      a first determination process of determining whether previous content data is stored in the memory, the previous content data being content data previously generated by the external program;
      a first display process of displaying, on the display, a first screen including, on the same screen, a program object for activating the external program and a content object corresponding to the previous content data determined as stored in the memory in the first determination process; and
      a first operation reception process of receiving an input operation on the first screen through the user interface,
   wherein the program causes the portable terminal to perform, when the program object is designated by the input operation on the first screen in the first operation reception process, a first activation process of activating the external program so as to cause the external program corresponding to the program object to newly generate the content data, and wherein the program causes the portable terminal to perform when the program object is not designated and the content object is designated by the input operation on the first screen in the first operation reception process:
  a first data reception process of receiving, as target content data, the previous content data corresponding to the content object from the external program that generates the previous content data; and
  an output instruction process of transmitting the output instruction information that instructs to execute the output operation for the target content data, to the output apparatus through the communication interface;
wherein the program causes the portable terminal to perform when the content object is designated by the input operation on the first screen in the first operation reception process:
  a second display process of displaying, on the display, a second screen including an output object and an editing object; and
  a second operation reception process of receiving an input operation on the second screen through the user interface,
wherein the program causes the portable terminal to perform, when the output object is designated by the input operation on the second screen in the second operation reception process, the first data reception process and the output instruction process, and
wherein the program causes the portable terminal to perform, when the editing object is designated by the input operation on the second screen in the second operation reception process, a second activation process of activating the external program generating the target content data so as to cause the external program to edit the target content data.

3. The non-transitory computer-readable medium according to claim 2,
wherein the program causes the portable terminal to perform, when the output instruction process is caused to be executed in the portable terminal, a second storing process of storing output completion information indicating that the output operation is completed in the memory in association with the content ID of the target content data,
wherein the program causes the portable terminal to perform when the content object is designated in the first operation reception process:
  a third determination process of determining whether the output completion information associated with the content ID of the target content data is stored in the memory; and
  the second display process of displaying the second screen further including an immediate output object when it is determined in the third determination process that the output completion information is stored in the memory, and of displaying the second screen not including the immediate output object when it is determined in the third determination process that the output completion information is not stored in the memory,
wherein the program causes the portable terminal to perform when the output object is designated in the second operation reception process:
  a third display process of displaying, on the display, a third screen including a preview image indicating an output image where the target content data is output;
  a third operation reception process of receiving a confirmation operation indicating that the preview image is checked, through the user interface; and
  the output instruction process when the confirmation operation is received in the third operation reception process, and
wherein the program causes the portable terminal to perform, when the immediate output object is designated in the second operation reception process, the output instruction process without executing the third display process and without executing the third operation reception process.

4. The non-transitory computer-readable medium according to claim 3,
wherein the program causes the portable terminal to perform:
  a conversion process of converting the target content data received in the first data reception process or the second data reception process into output data of a format capable of executing the output operation;
  an overwriting process of overwriting a set of the output data and the content ID already stored in the memory with a set of the output data converted in the last conversion process and the content ID of the target content data; and
  the output instruction process of transmitting the output instruction information that instructs the output operation for the output data stored in the memory, to the output apparatus through the communication interface, and
wherein the program causes the portable terminal to perform when the immediate output object is designated in the second operation reception process:
  a fourth determination process of determining whether the output data associated with the content ID of the target content data is stored in the memory;
  the second data reception process, the conversion process, the overwriting process, and the output instruction process when it is determined in the fourth determination process that the output data is not stored in the memory; and
  the output instruction process without executing the second data reception process, without executing the conversion process, and without executing the overwriting process, when it is determined in the fourth determination process that the output data is stored in the memory.

5. A non-transitory computer-readable medium having a program stored thereon and readably by a computer of a portable terminal comprising a memory, a display, a user interface, and a communication interface, and enabling to execute an external program that can be installed to the portable terminal and is configured to generate content data in accordance with an input operation received through the user interface,
wherein the program is a program configured to transmit output instruction information that instructs to execute an output operation of outputting content data, to an output apparatus through the communication interface,
wherein the program, when executed by the computer, causes the portable terminal to perform:
  a first determination process of determining whether previous content data is stored in the memory, the previous content data being content data previously generated by the external program;
  a second determination process of determining whether each of a plurality of the external programs is installed in the portable terminal, the plurality of external programs including the external program that generated the previous content data;
a first display process of displaying, on the display, a first screen including, on the same screen, a program object for activating the external program determined to be installed by the second determination process and a content object corresponding to the previous content data determined as stored in the memory in the first determination process; and
a first operation reception process of receiving an input operation on the first screen through the user interface,
wherein the program causes the portable terminal to perform, when the program object is designated by the input operation on the first screen in the first operation reception process, a first activation process of activating the external program so as to cause the external program corresponding to the program object to newly generate the content data, and
wherein the program causes the portable terminal to perform when the program object is not designated and the content object is designated by the input operation on the first screen in the first operation reception process:
a first data reception process of receiving, as target content data, the previous content data corresponding to the content object from the external program that generates the previous content data; and
an output instruction process of transmitting the output instruction information that instructs to execute the output operation for the target content data, to the output apparatus through the communication interface;
wherein the program further causes the portable terminal to perform:
a third determination process of determining whether editing-in-progress data, that is the content data being generated by the external program determined as stored in the second determination process of the plurality of external programs, is stored in the memory;
the first display process of displaying, on the display, the first screen further including an editing-in-progress object that corresponds to the editing-in-progress data determined as stored in the second determination process; and
a third activation process of activating the external program that generates the editing-in-progress data, so as to edit the editing-in-progress data, when the editing-in-progress object is designated in the first operation reception process.

6. The non-transitory computer-readable medium according to claim 5,
wherein the program causes the portable terminal to perform the first display process of displaying, on the display, the first screen including the content object and the editing-in-progress object that are displayed in different display aspects.

7. A non-transitory computer-readable medium having a program stored thereon and readably by a computer of a portable terminal comprising a memory, a display, a user Interface, and a communication interface, and enabling to execute an external program that can be installed to the portable terminal and is configured to generate content data in accordance with an input, operation received through the user interface,
wherein the program is a program configured to transmit, output instruction information that instructs to execute an output operation of outputting content data, to an output apparatus through the communication interface,
wherein the program, when executed by the computer, causes the portable terminal to perform:
a first determination process of determining whether previous content data is stored in the memory, the previous content data being content data previously generated by the external program;
a first display process of displaying, on the display, a first screen including, on the same screen, a program object, for activating the external program and a content object corresponding to the previous content data determined as stored in the memory in the first determination process; and
a first operation reception process of receiving an input operation on the first screen through the user interface,
wherein the program causes the portable terminal to perform, when the program object is designated by the input operation on the first screen in the first operation reception process, a first, activation process of activating the external program so as to cause the external program corresponding to the program object to newly generate the content data, and
wherein the program causes the portable terminal to perform when the program object is not designated and the content object is designated by the input operation on the first screen in the first operation reception process:
a first data reception process of receiving, as target content data, the previous content, data corresponding to the content, object from the external program that, generates the previous content data; and
an output instruction process of transmitting the output instruction information that instruct to execute the output operation for the target content data, to the output apparatus through the communication interface;
wherein the program further causes the portable terminal to perform:
a third operation reception process of receiving an input operation of designating one of a plurality of the output apparatuses capable of performing communication through the communication interface, through the user interface;
a storing process of storing, in the memory, a designated apparatus ID for identifying the output apparatus designated in the third operation reception process;
a second determination process of determining whether the designated apparatus ID is stored in the memory when the content object is designated in the first operation reception process;
the output instruction process of transmitting the output instruction information to the output apparatus identified with the designated apparatus ID through the communication interface when it is determined that in the second determination process that the designated apparatus ID is stored in the memory; and
a second activation process of activating the external program that generates the target content data, so as to edit the target content data, when it is determined that in the second determination process that the designated apparatus ID is not stored in the memory.

* * * * *